(No Model.)
2 Sheets—Sheet 1.
T. & W. H. COLDWELL.
LAWN MOWER.
No. 532,230.
Patented Jan. 8, 1895.
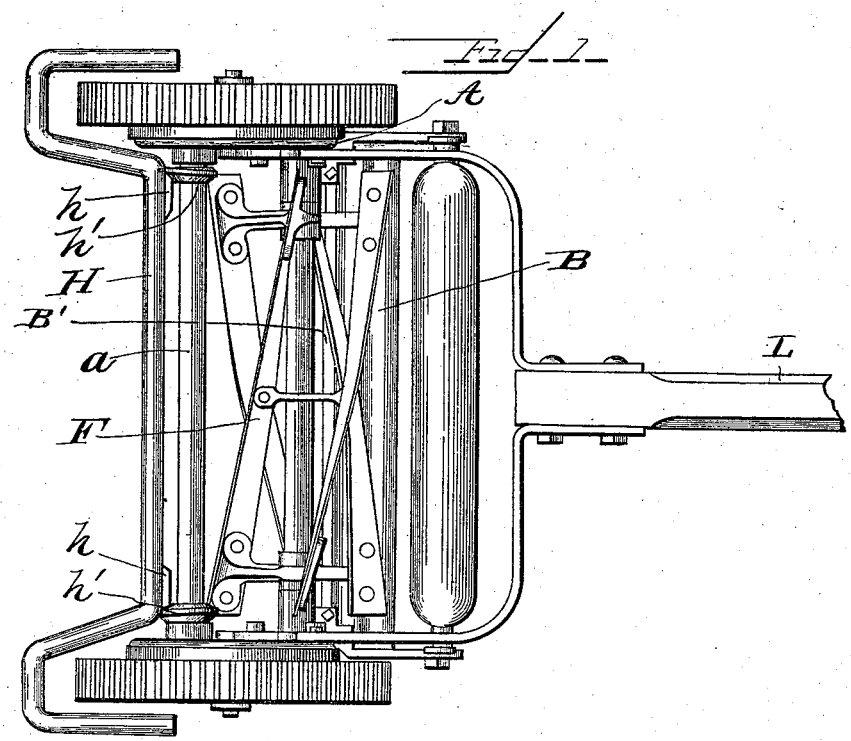
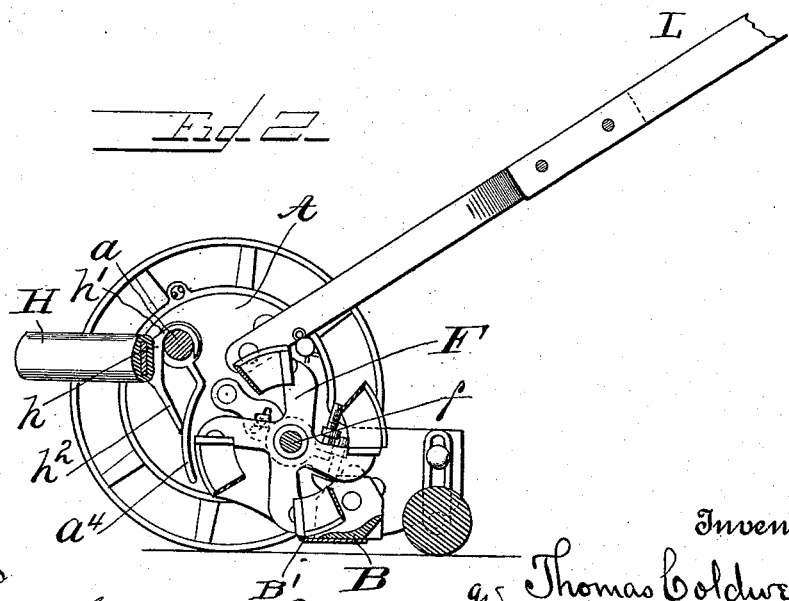
Witnesses
Inventors
Thomas Coldwell
William H. Coldwell
By Whitaker & Prevost Attorneys.

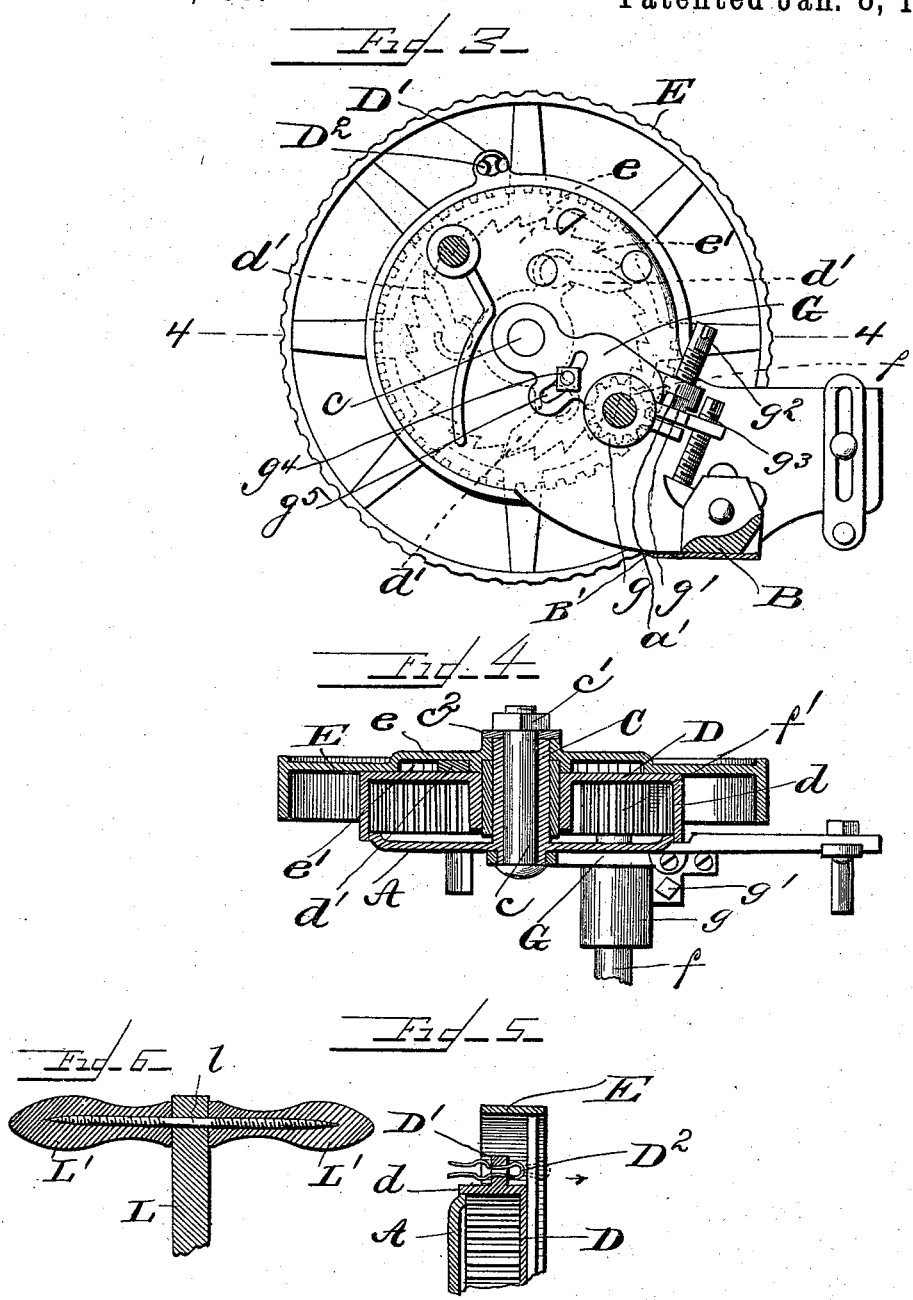

UNITED STATES PATENT OFFICE.

THOMAS COLDWELL AND WILLIAM H. COLDWELL, OF NEWBURG, NEW YORK.

LAWN-MOWER.

SPECIFICATION forming part of Letters Patent No. 532,230, dated January 8, 1895.

Application filed April 26, 1894. Serial No. 509,166. (No model.)

*To all whom it may concern:*

Be it known that we, THOMAS COLDWELL and WILLIAM H. COLDWELL, citizens of the United States, residing at Newburg, in the county of Orange and State of New York, have invented certain new and useful Improvements in Lawn-Mowers; and we do hereby declare the following to be a full, clear, and exact description of the invention, such as will enable others skilled in the art to which it appertains to make and use the same.

Our invention is an improvement in lawn mowers and consists in the novel features of construction and combination of parts hereinafter fully described, reference being had to the accompanying drawings, which illustrate one form in which we have contemplated embodying our invention, and said invention is fully disclosed in the following description and claims.

Referring to the said drawings, Figure 1 is a top plan view of a lawn mower embodying our invention. Fig. 2 is a vertical sectional view of the same. Fig. 3 is an enlarged view similar to Fig. 2 with the rotary cutter removed. Fig. 4 is a horizontal section on line 4—4 of Fig. 3. Fig. 5 is a detail sectional view of a portion of the driving wheel and gear wheel, showing the manner of connecting the two to revolve the cutter backward for sharpening the cutting knives. Fig. 6 is a detail sectional view of the handle of the machine.

In the drawings A A represent the side plates of the main frame of the mower, which are rigidly connected at the front of the machine by the front bar $a$ and at the back by the stationary knife bar B, which is rigidly bolted or otherwise secured to the side plates A and provided with a knife B'. By rigidly securing the stationary knife bar to the side plates we form a very strong, durable and rigid frame braced by the front rod and the stationary cutter, and the frame may therefore be made lighter than would be possible otherwise.

To each of the side plates A is secured a sleeve C preferably made integrally with the plate A and which serves as the axle for one of the driving gears. Upon each of the sleeves C is mounted the hub of a gear wheel D having a peripheral flange $d$ provided internally with gear teeth and upon said sleeve C is also mounted the driving wheel E. The driving wheel E and gear wheel D are held in position by a bolt $c$ passing through the sleeve C and provided with a nut $c'$ and a washer $c^2$ of vegetable fiber, which is sufficiently rigid to securely hold the revolving parts in position, and yet acts as a packing to prevent very largely the rattle and noise incident to the use of a lawn mower where metal washers are employed.

In order to operatively connect the driving wheel E and gear wheel D so as to permit the driving wheel to be rotated backward without operating the cutter, we provide the inner face of the driving wheel with a circular recess $e$, having a peripheral edge provided with ratchet teeth $e'$ and we provide the exterior of the gear D with a series of gravity pawls $d'$ $d'$ pivotally secured to said gear in any desired way, which pawls engage the ratchet teeth of the driving wheel, when the machine is pushed forward, as will be readily understood, the pawls slipping over the ratchet teeth when the machine is drawn backward. (See Figs. 3 and 4.) F indicates the rotary cutter, the shaft $f$ of which is provided at each end with a pinion $f'$ meshing with the internal teeth of one of the gear wheels D.

In order to allow for adjustment in case of wear between the rotary cutter and the stationary knife B', we provide devices for adjusting the rotary cutter with respect to the stationary cutter, the latter being held rigidly in position as before described. To this end we provide each side frame A with a hanger G pivotally mounted at one end on the bolt $c$ which is in line with the axis of rotation of the gear wheel D and carrying the rotary cutter shaft $f$ at the other end. Hence the rotary cutter can be adjusted to any desired position without interfering with the proper engagement of the pinion $f'$ and gear wheel D, the side frame A being slotted to allow for the adjustment of shaft $f$.

Each of the hangers G is provided with a bearing $g$ split as indicated so as to allow for adjustment in case of wear, the adjustment being effected by an adjusting screw $g'$. In order to furnish a simple adjusting device for the hanger G, we provide the rear end of the hanger with an adjusting screw $g^3$ which passes through a threaded hole in the hanger and bears against a stationary lug $a'$ on the side frame A and we also provide a set screw $g^2$ which engages a screw threaded aperture in a lug $a^2$ on the side frame A above the hanger and bears against the upper face of the hanger. By loosening one of the screws $g^2$, $g^3$ and tightening the other the hanger may be adjusted to and held in any desired position with respect to the stationary cutter blade B. In order to secure the hangers G firmly against the side plates A, we provide each with a bolt $g^4$ passing through a slot $g^5$ in the hanger and secured by a nut or otherwise to side plate A. We also provide devices by means of which the cutters may be easily and quickly sharpened. It has been found that the cutters of lawn mowers may be advantageously and evenly sharpened by spreading a paste of oil and emery upon the stationary cutter and then rapidly revolving the rotary cutter backward. In order to do this, it is necessary to remove the driving wheels and replace them in such a way as to reverse the clutch mechanisms with which they are ordinarily provided and this while a tedious and disagreeable operation is also a source of trouble if the operator is unable for any reason to correctly replace the parts after the cutters are sharpened. We obviate these difficulties and enable the driving wheels to operate the cutters backward in the following manner:

Each of the gear wheels D is provided on the exterior of its flange $d$ with a perforated ear D'. (See Figs. 3 and 5.) In this ear is located an adjustable pin or stud $D^2$ of any suitable form, which may when desired, be moved longitudinally so as to engage some part of the driving wheel E as one of the spokes with which it is provided, or if it is a solid wheel, the said pin might be made to engage an aperture in the web of the wheel. In Fig. 5 we have shown a spring cotter $D^2$ which is so constructed that it may be pulled in the direction of the arrow so as to engage one of the spokes of the drive wheel as shown in dotted lines. When one or both of these pins $D^2$ are in operative position, it will be seen that if the mower is drawn backward the driving wheels will be compelled to turn the gear wheels D backward and thus rotate the cutter in a reverse direction so that it may be very quickly and easily sharpened in the manner before described. When sufficiently sharp the pins $D^2$ will be pushed in out of the way or they may be removed altogether and replaced when the cutters are to be sharpened. We also provide our improved mower with a guard by means of which the machine is prevented from injuring or marring trees, shrubbery, tombstones, ornamental coping or other objects with which it may come in contact. Our improved guard consists of an integral elastic bar H preferably of steel covered with rubber or other suitable cushioning material. The bar H shown in Figs. 1 and 2 has its central portion lying adjacent and parallel to the front rod $a$ of the machine frame and its ends bent around the front portions of the driving wheels, and extending nearly to the center of said wheels on the outside.

In order to support the guard in proper position we employ a pair of supports $h$ consisting each of a hook portion $h'$ for engaging the front rod A and a depending arm $h^2$ for engaging a projecting part of the side frame as shown in Fig. 2, in which said arm is shown as engaging a flange or web $a^4$ which forms a guard to prevent grass from getting in around the ends of the rotary cutter. The depending arms $h^2$ serve to hold the guard in proper horizontal position, as shown in Fig. 2.

We prefer to cover the entire bar H with a coating of rubber vulcanized thereto and it will thus be seen that the guard will have both a cushioned surface and will itself possess considerable resiliency so as to protect objects with which it comes in contact from being marred or injured.

By forming the resilient guard bar with portions curved around the wheels as shown and described the wheels, hubs, and fastening screws will be prevented from knocking and injuring any objects with which they may come in contact. It is especially desirable to have the guard extend around the wheels as they are more liable to come into contact with objects than any other parts of the machine, and it will be seen that the free ends of the guard being of elastic material and covered with rubber will easily prevent injury to any objects with which the wheels may come in contact.

In Fig. 6, we have shown a very desirable and effective construction of handle for propelling the mower, and is very strong and durable as it avoids the use of a mortise and tenon construction. As shown in the drawings the main bar L is provided with a double ended screw $l$, and the handle is formed in two parts L' L' each having a longitudinal recess therein, and screwed upon the screw $l$. When the two parts are screwed up tightly against the main bar L a very strong and rigid handle is provided. The screw $l$ is made of sufficient length to extend a considerable distance into each section of the handle and will therefore serve to materially strengthen the same.

What we claim, and desire to secure by Letters Patent, is—

1. In a lawn mower the combination with the main frame, of a guard of resilient material provided with a covering of elastic material, said guard having portions extending forward of and outside of the driving wheels, and provided with brackets having hook portions for engaging a cross rod of the frame and depending portions engaging parts of the main frame, for holding said guard in operative position, substantially as described.

2. In a lawn mower the combination with the side frames provided with guard flanges, and the front cross rod, of a guard of resilient material provided with a covering of elastic material, said guard having portions extending forward of, around and outside of the driving wheels, and supporting brackets secured to said guard having hook portions for engaging said front rod and depending portions engaging the said guard flanges of the side frames, substantially as described.

In testimony whereof we affix our signatures in presence of two witnesses.

THOMAS COLDWELL.
WILLIAM H. COLDWELL.

Witnesses:
W. J. WYGANT,
GEO. A. PRICE.